(12) United States Patent
Barkan et al.

(10) Patent No.: US 8,079,526 B2
(45) Date of Patent: Dec. 20, 2011

(54) LONG RANGE IMAGING READER

(75) Inventors: Edward Barkan, Miller Place, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 731 days.

(21) Appl. No.: 12/077,231

(22) Filed: Mar. 18, 2008

(65) Prior Publication Data

US 2009/0236426 A1 Sep. 24, 2009

(51) Int. Cl.
*G06K 7/10* (2006.01)
(52) U.S. Cl. .......... 235/472.01; 235/462.01; 235/462.24
(58) Field of Classification Search ............. 235/472.01, 235/462.01, 462.24, 462.23
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,192,845 A | 3/1993 | Kirmsse et al. | |
| 5,304,786 A | 4/1994 | Pavlidis et al. | |
| 5,703,349 A | 12/1997 | Meyerson et al. | |
| 5,763,864 A | 6/1998 | O'Hagan et al. | |
| 5,988,506 A | 11/1999 | Schaham et al. | |
| 6,260,763 B1* | 7/2001 | Svetal ........................ 235/462.22 |
| 6,431,452 B2* | 8/2002 | Feng ......................... 235/472.01 |
| 2003/0090805 A1 | 5/2003 | Ohkawa et al. | |
| 2003/0128405 A1* | 7/2003 | Tay ............................... 358/474 |
| 2005/0011952 A1 | 1/2005 | Krichever | |
| 2005/0199725 A1 | 9/2005 | Craen et al. | |
| 2006/0228834 A1* | 10/2006 | Lee et al. ....................... 438/144 |
| 2007/0051812 A1 | 3/2007 | Lopez et al. | |
| 2007/0295814 A1 | 12/2007 | Tanaka et al. | |
| 2009/0108075 A1* | 4/2009 | Vinogradov et al. .... 235/462.42 |

FOREIGN PATENT DOCUMENTS

| | | |
|---|---|---|
| EP | 1804192 | 7/2007 |
| JP | 09-130683 A | 5/1997 |

OTHER PUBLICATIONS

International Search Report and the Written Opinion of the International Searching Authority for Application No. PCT/US2009/037095 mailed May 5, 2009.
International Preliminary Report on Patentability dated Sep. 30, 2010 in related case PCT/US2009/037095.
European Search report dated Jun. 30, 2011 in related case Europe application 09723102.1.

* cited by examiner

*Primary Examiner* — Ahshik Kim
(74) *Attorney, Agent, or Firm* — Nongqiang Fan

(57) ABSTRACT

An imaging module or reader for electro-optically reading both far-out and close-in, one-dimensional symbols located at variable working distances from the module or reader, includes a solid-state imager having a linear array of image sensors arranged in a single row for capturing return light from the symbols, and an imaging lens assembly for adjustably focusing the return light onto the linear array of image sensors to enable the symbols to be read.

16 Claims, 3 Drawing Sheets

LONG RANGE IMAGING READER

DESCRIPTION OF THE RELATED ART

Solid-state imaging systems or imaging readers, as well as moving laser beam readers or laser scanners, have both been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager having a sensor array of cells or photosensors, which correspond to image elements or pixels in a field of view of the imager, and an imaging lens assembly for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Moving laser beam readers generally include a laser for emitting a laser beam, a focusing lens assembly for focusing the laser beam to form a beam spot having a certain size at a predetermined working distance, a scan component for repetitively scanning the beam spot across a target symbol in a scan pattern, for example, a line or a series of lines across the target symbol, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

In some applications, for example, in warehouses having symbols on products located on high shelves, it is necessary that such symbols be capable of being read at an extended range of working distances, for example, on the order of fifty feet, away from the reader. It is conventional to employ long range, moving laser beam readers to read such extended range symbols, especially one-dimensional symbols, which represent a majority of the market for reading symbols.

As advantageous as moving laser beam readers are in reading such extended range one-dimensional symbols, they are disadvantageous in that they are relatively expensive to manufacture, for example, in comparison to imaging readers, and can only be built in manufacturing facilities having fairly specialized optical alignment capabilities. In addition, long range laser beam readers are relatively large, rendering them difficult to package in small portable handheld devices. Imaging readers, typically employing a two-dimensional array of sensors, have been used to read symbols, but they cannot read one-dimensional symbols at the same extended range as moving laser beam readers can.

SUMMARY OF THE INVENTION

One feature of the present invention resides, briefly stated, in an imaging reader or module for, and a method of, electro-optically reading both far-out and close-in, one-dimensional symbols located at variable working distances from the reader. The reader or module includes a solid-state imager having a linear array of image sensors or pixels arranged in a single row for capturing return light from the symbols, and an imaging lens assembly for adjustably focusing the return light onto the linear array of image sensors to enable the symbols to be read.

The linear sensor array of this invention provides several advantages over a two-dimensional or area sensor array for long range reading applications. The linear sensor array of this invention is smaller and less expensive than area sensor arrays. The signals produced by the linear array of this invention can be decoded using microprocessors or controllers that are less expensive than the ones needed to decode signals from area arrays, thereby further reducing the overall cost of the imaging reader. The linear sensor array of this invention also provides a higher resolution by virtue of a larger number of sensors or pixels than are available in a single row of sensors in an area array. For example, the linear array of this invention preferably has on the order of 1,500 or more, e.g., 2,000, of the image sensors arranged in the single row, which is approximately double that typically encountered in a row of an area array. Doubling pixel resolution can theoretically double working distance range. The linear sensor array of this invention also operates at a higher scan rate than that of area arrays to provide a more responsive reader.

The linear array of this invention uses elongated sensors, e.g., are generally rectangular in shape, to improve sensitivity (pixels in area arrays are square). For example, each of the sensors has a generally elongated shape and measures about 5.5 microns in width by 64 microns in height. Thus, the sensors are much taller than they are wide. In general, tall sensors are advantageous for long range reading as they increase the field of view of each individual sensor, thereby allowing the sensors to collect more light, and making the imager more sensitive.

In this case, however, the magnification of the imaging lens assembly is very high when reading symbols at great working distances, such as around 50 feet. At this distance, the vertical field of view of each sensor can exceed the vertical height of the symbol, thereby reducing the apparent contrast of the symbol and also leading to the potential problem of reading things above and below the symbol at the same time, thereby reducing decodability. It would, therefore, be advantageous to adjust the vertical field of view of each sensor to a height that is no taller than the height of a symbol that might typically be read from a great distance. For example, the projected height of the sensors on a far-out symbol can be as tall as 1 to 1.5 inches at large working distances due to the high magnification. This is too tall and can be reduced to a more reasonable height, say on the order of one-half inch, by using an additional cylindrical optical element in the imaging lens assembly. The cylindrical optical element can also be used to increase the projected height of the sensors in the event that an array with shorter or square sensors is being used. Thus, such additional optical elements can be used to increase or decrease the projected pixel height as necessary for optimum performance, without requiring a custom sensor array.

In a preferred embodiment, the imager is an unpackaged chip placed directly on a printed circuit board in the reader, and wire-bonded to the board. Elimination of the package keeps the overall system small and inexpensive. No existing long range readers use unpackaged arrays. Also, a double-folded optical path for the return light is provided between the imager and the imaging lens assembly to render the module compact, preferably in a standardized form factor measuring 19 millimeters by 38 millimeters by 25 millimeters.

Another advantage of the linear array in the long range reader is that an illumination system can be devised that projects more intense light over a field of view of the imager than is possible with an area array. This is because all of the light available from illumination light sources, such as light emitting diodes (LEDs), is concentrated into a narrow visible line, as opposed to being spread out over a broad area of the larger field of view of an area array. This increased level of illumination (along with greater sensitivity as mentioned above) allows the reader to work at greater working distances away from the reader, and in darker environments than is possible with an area array. The more intense illumination also allows shorter imager exposure times to be used, thereby making a linear array less sensitive to motion of the reader or of the symbol during reading as compared to an area array. This is important when reading symbols at an extended range with a handheld reader, where small hand motions can blur the image generated by the imager, thereby rendering the symbol unreadable if imager exposure times are too long.

The narrow visible line can be used by an operator to aim the reader at a symbol. At larger and larger working distances, however, this visible line becomes dimmer and more diffused, thereby making it difficult for the operator to use the line for aiming. This invention, therefore, also includes projection of a bright beam of light, for example, from a laser, to aid in aiming at symbols that are so far away that the LED illumination is not distinct enough.

This illumination system could project a simple spot of light, which would provide excellent visibility at a distance. Alternatively, it could project a short visible line aligned with the linear field of view of the linear array, so as to help the operator orient the reader with the symbol. This short visible line can be projected over an angle that is smaller than the horizontal field of view angle of the imager, as opposed to approximately matching the field of view of the imager as is commonly done with the illumination systems in linear imagers. Keeping the laser aiming line short maintains brightness at long working distances.

In addition, when reading at long distances, the field of view of the imager will be wider than necessary to scan symbols, so that there is no need to indicate where the actual end points of the field of view are by matching the aiming visible line with the field of view. When used at closer range, the illumination line will be bright enough to see, and since its length approximately matches the length of the imager's field of view, it will provide a visual indication approximating the end points of the field of view, which is a useful guide when scanning long symbols that nearly fill the field of view, as can happen when reading at close range where the field of view is relatively narrow.

The laser (or other light source) aiming spot can also be used to assist the auto-focus imaging lens assembly by providing ranging data via parallax which will make the spot appear in a different part of the imager's field of view, depending on distance to the symbol on which the aiming spot is projected. It is typically difficult to align a small spot with the linear field of view accurately enough to insure that it remains within the field of view throughout the working distance range. This problem may be eased by adding some vertical height to the projected aiming pattern so as to make it easier to maintain at least part of the pattern within the field of view over the entire working distance range. A preferred aiming spot would be a short horizontal line (short means not as long as the entire linear field of view) which also has an even shorter vertical line passing through its center. The appearance of this would be a cross with a wide horizontal section and a short vertical section. The horizontal section would be aligned by the operator for aiming. The vertical section would help insure that at least part of the pattern is visible to the array throughout the working distance range, for ranging purposes. A brighter spot can be positioned at the junction of the two lines, if desired, to assure maximum visibility at extended range.

Another way to use the laser to assist the auto-focus imaging lens assembly is to measure a size of a blur in the image of the laser spot on the array, and to adjust the auto-focus imaging lens assembly until the image becomes small, at which time the illumination LEDs are energized to capture an image of the entire symbol for decoding. Use of the laser for assistance (either by ranging or by looking at image blur) allows the illumination LEDs to be de-energized until the imager is focused. Minimizing power consumption is important since long range readers are usually battery powered. In the long range imager, the illumination LEDs represent a very large portion of overall power consumption; hence, minimizing illumination time is important.

Another way to use a laser to assist the auto-focus imaging lens assembly is to use an infrared (IR) laser separate from a visible aiming laser that is only used for aiming. The IR laser projects a vertical line that is invisible to the operator, but which is visible to the imager. The extended vertical dimension of this line assures that at least part of the IR laser is within the field of view regardless of working distance, without requiring precision aiming of the IR laser. Since the visible laser will no longer be used for auto-focus assistance, its projected pattern can be optimized for brightness or orientation purposes without adding additional focus assist features (such as a vertical line segment) which might be confusing to the operator.

A linear array optimized for very long range uses a much narrower field of view angle than prior art linear arrays, which are designed to be able to read long symbols within a few inches of the reader. Typical prior art linear arrays use field of view angles of between around 35° to 45°. For long range scanning, a field of view angle of around 10° to 15° is used. This narrow angle assures that adequate resolution is maintained over an extended range. The narrow angle also enables more intense illumination since the light from the illumination LEDs does not need to be spread over such a wide angle.

The auto-focus imaging lens assembly can advantageously utilize a nonmovable liquid lens or a variable focal length lens using liquid crystal technology, or it can use a lens that is moved by a motor or moved magnetically.

The method of electro-optically reading both far-out and close-in, one-dimensional symbols located at variable working distances from an imaging reader is advantageously performed by capturing return light from the symbols with a solid-state imager having a linear array of image sensors arranged in a single row, and by adjustably focusing the return light onto the linear array of image sensors to enable the symbols to be read.

The novel features which are considered as characteristic of the invention are set forth in particular in the appended claims. The invention itself, however, both as to its construction and its method of operation, together with additional

DETAILED DESCRIPTION OF THE PREFERRED EMBODIMENTS

Figure 1:
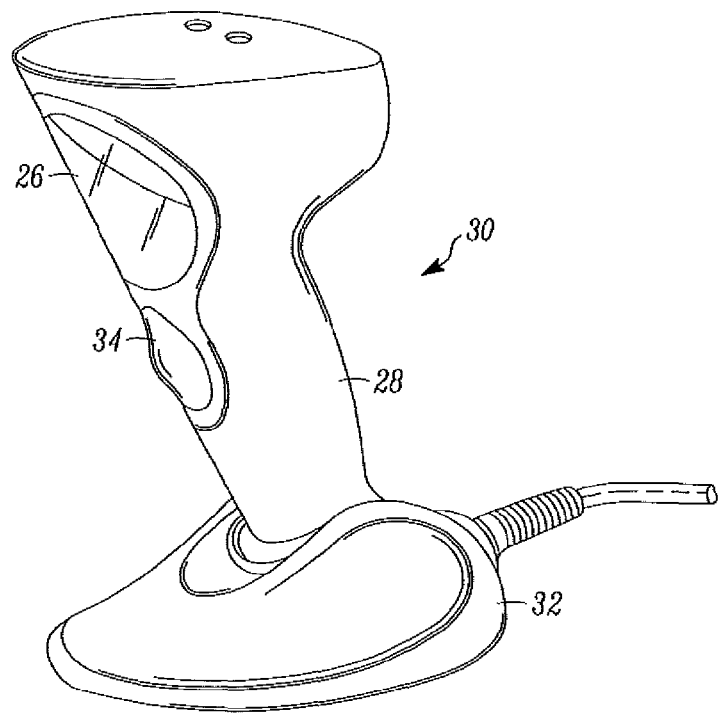
FIG. 1 is a perspective view of a portable imaging reader operative in either a handheld mode, or a hands-free mode, for capturing return light from symbols.

Reference numeral 30 in FIG. 1 generally identifies an imaging reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which a trigger 34 is manually depressed to initiate imaging of indicia, especially one-dimensional symbols, to be read at far distances from the window 26. In another variation, the base 32 can be omitted, and housings of other configurations can be employed. A cable, as illustrated in FIG. 1, connected to the base 32 can also be omitted, in which case, the reader 30 communicates with a remote host by a wireless link, and the reader is electrically powered by an on-board battery.

Figure 2:
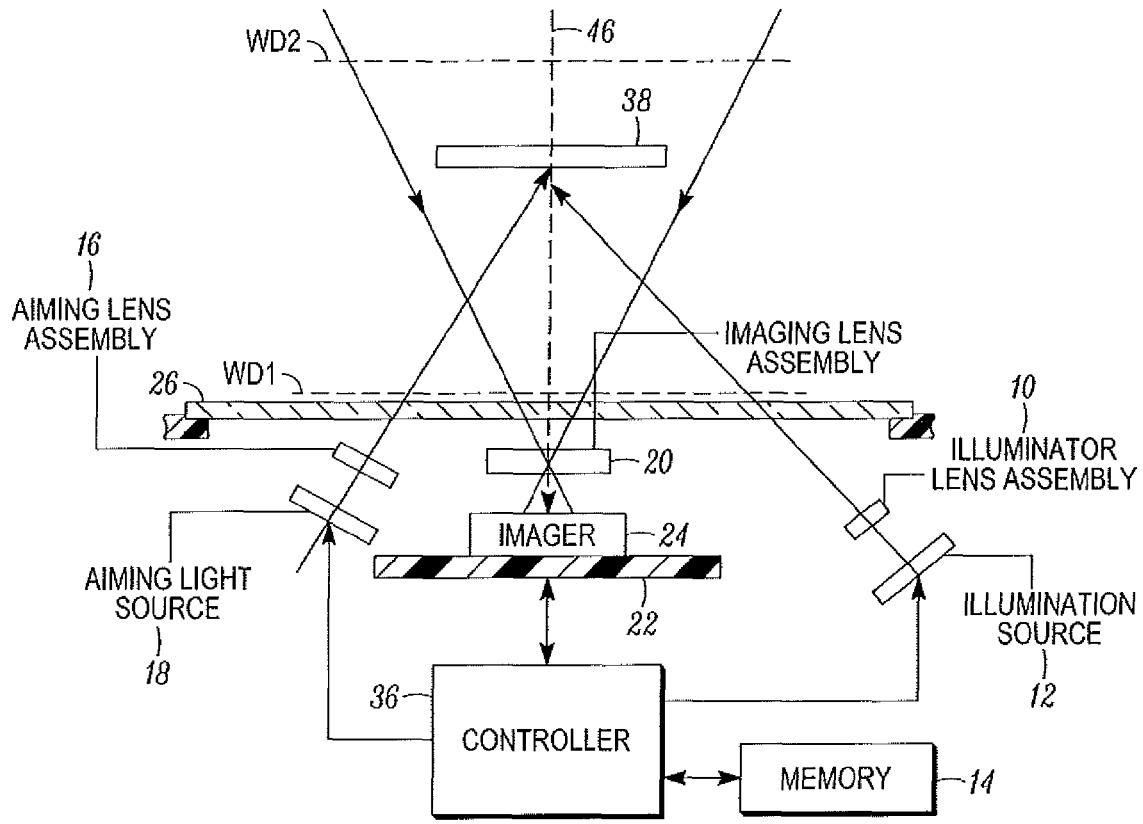
FIG. 2 is a schematic diagram of various components of the reader of FIG. 1.

As schematically shown in FIG. 2, an imager 24 is mounted on a printed circuit board 22 in the reader. The imager 24 is a solid-state device, for example, a CCD or a CMOS imager, especially an unpackaged chip, and has a one-dimensional linear array of addressable image sensors or pixels arranged in a single row and operative for detecting return light captured by an imaging lens assembly 20 along an optical path 46 through the window 26. The return light is scattered and/or reflected from a one-dimensional symbol 38 over a field of view. The imaging lens assembly 20 is operative for adjustably focusing the return light onto the linear array of image sensors to enable the symbol 38 to be read. The symbol 38 is located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

Figure 5:
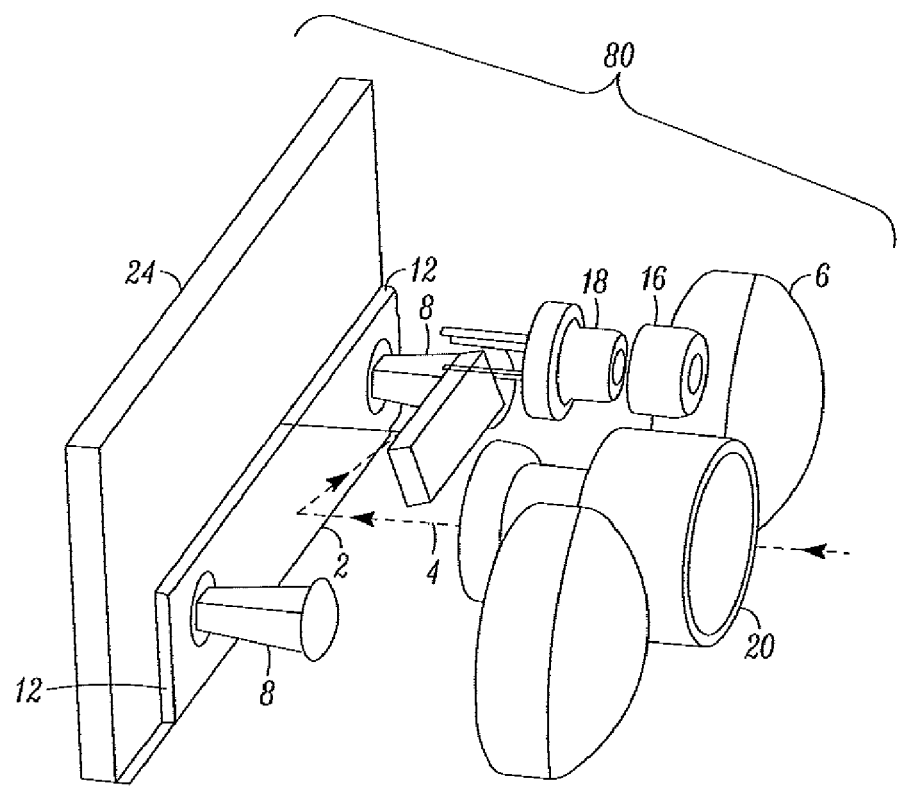
FIG. 5 is an exploded perspective view of various components of the reader of FIG. 1, the components together comprising a module for use in readers of different housing configurations in accordance with the present invention.

An illuminator 12 is also mounted in the imaging reader and preferably includes a plurality of light sources, e.g., light emitting diodes (LEDs), and an illuminator lens assembly 10 to uniformly illuminate the symbol 38. The illuminator lens assembly 10, as best seen in FIG. 5, includes a plurality of light pipes 8 and a plurality of lenses 6. The lenses 6 can be used, as described above, to illuminate a visible, uniform line of light onto the symbol. An aiming pattern generator is also mounted in the imaging reader and preferably includes an aiming light source 18, e.g., a laser or an LED, and an aiming lens assembly 16 for generating an aiming beam pattern. As shown in FIG. 2, the imager 24, the illuminator 12 and the light source 18 are operatively connected to a controller or microprocessor 36 operative for controlling the operation of these components. A memory 14 is connected and accessible to the controller 36. Preferably, the microprocessor is the same as the one used for processing the return light from target symbols and for decoding the captured target images.

In operation, the microprocessor 36 sends a command signal to energize the aiming light source 18 prior to reading, and also pulses the illuminator 12 for a short exposure time period, say 500 microseconds or less, and energizes and exposes the imager 24 to collect light, e.g., illumination light and/or ambient light, from a target symbol only during said exposure time period. A typical array needs about 33 milliseconds to acquire the entire target image and operates at a frame rate of about 30 frames per second.

The linear sensor array 24 provides several advantages over a two-dimensional or area sensor array for long range reading applications. The linear sensor array 24 is smaller and less expensive than an area sensor array. The signals produced by the linear array 24 can be decoded using the microprocessor or controller 36 that is less expensive than the one needed to decode signals from an area array, thereby further reducing the overall cost of the imaging reader. The linear array 24 also provides a higher resolution by virtue of a larger number of sensors or pixels than are available in a single row of sensors in an area array. For example, the linear array 24 of this invention preferably has on the order of 1,500 or more, e.g., 2,000, of the image sensors arranged in the single row, which is approximately double that typically encountered in a row of an area array. Doubling pixel resolution can theoretically double working distance range. The linear array 24 also operates at a higher scan rate than that of an area array to provide a more responsive reader.

The linear array 24 of this invention uses elongated sensors, e.g., are generally rectangular in shape, to improve sensitivity (pixels in area arrays are square). For example, each of the sensors has a generally elongated shape and measures about 5.5 microns in width by 64 microns in height. Thus, the sensors are much taller than they are wide. In general, tall sensors are advantageous for long range reading as they increase the field of view of each individual sensor, thereby allowing the sensors to collect more light, and making the imager more sensitive.

In a preferred embodiment, the unpackaged chip 24 is placed directly on the printed circuit board 22 in the reader, and wire-bonded to the board. Elimination of the package keeps the overall system small and inexpensive.

Figure 3:
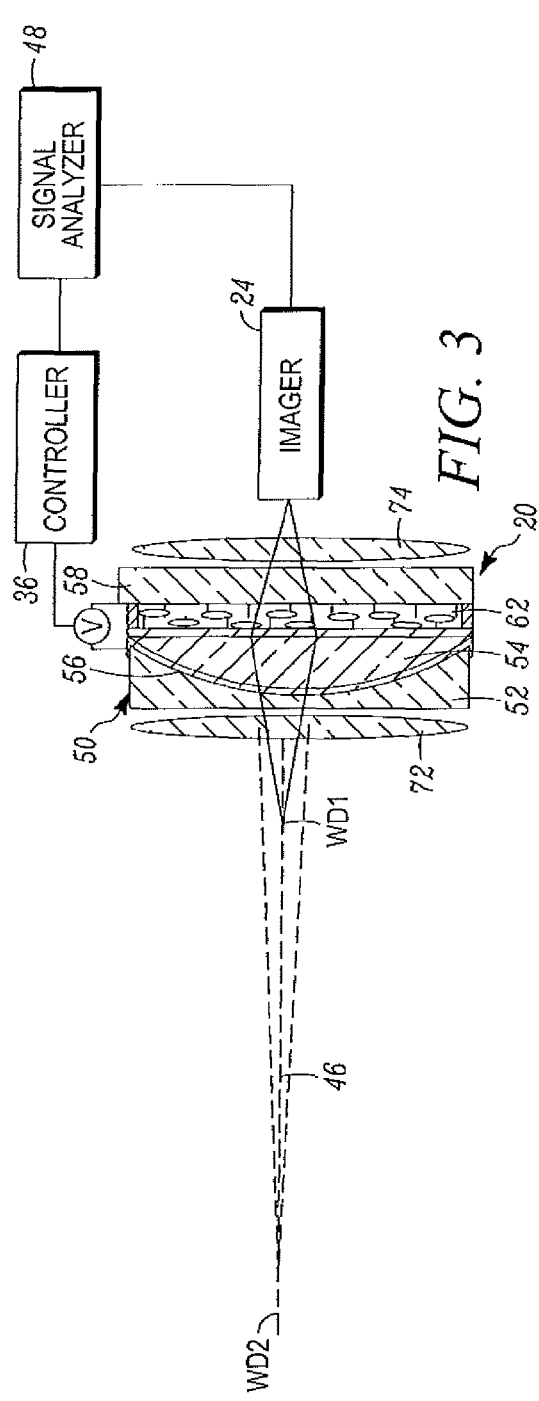
FIG. 3 is a schematic diagram depicting operation of the reader of FIG. 1 in accordance with one embodiment of the present invention.
Figure 4:
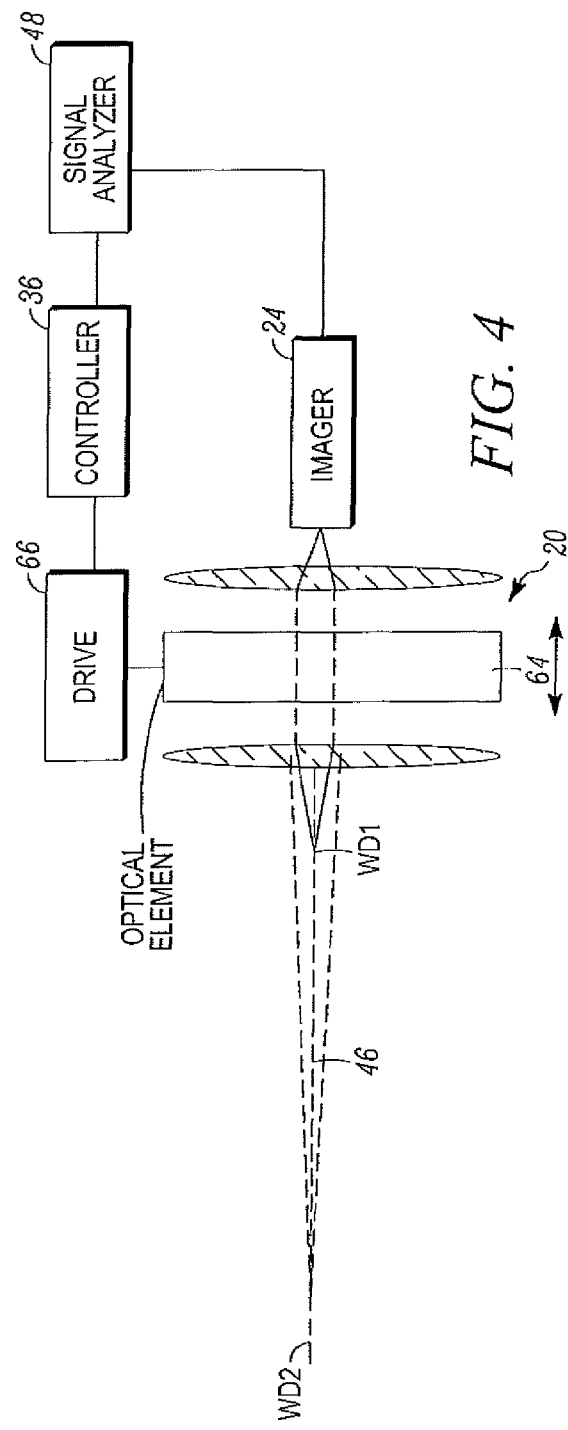
FIG. 4 is a schematic diagram depicting operation of the reader of FIG. 1 in accordance with another embodiment of the present invention.

The auto-focus imaging lens assembly can advantageously utilize a nonmovable liquid lens or a variable focal length lens 50 using liquid crystal technology, as shown in FIG. 3, or it can use a lens or like optical element 64 that is mechanically or magnetically moved by a drive 66, as shown in FIG. 4.

Thus, a variable liquid crystal (LC) lens 50, as shown in FIG. 3, has a first, glass or polymer, substrate having a portion 52 with a concave surface, another portion 54 with a convex surface of complementary contour to the concave surface, and a curved, optically transparent, electrically conductive, electrode 56 made from a material such as indium-tin-oxide between the portions 52, 54 of the substrate. The LC lens 50 also has a second, glass or polymer, generally planar substrate 58 having a surface coated with a generally planar, optically transparent, electrically conductive, electrode 60. The two substrates face an LC layer or cell 62 that has at least one semi-ordered, mesomorphic or nematic phase, in addition to a solid phase and an isotropic liquid phase. Molecules of the nematic LC layer typically are rod-shaped with the average direction of the long axes of the rod-shaped molecules being designated as the director, or may be disk-shaped with the direction perpendicular to the disk-shaped molecules being designated as the director. The nematic phase is characterized in that the directors are aligned in a preferred direction.

Birefringence in nematic LC materials is most readily described in terms of a splitting of incoming light entering the LC layer into two perpendicularly polarized rays called the ordinary ray and the extraordinary ray. A variation in a refractive index of the LC layer 62 with respect to the extraordinary ray is effected by varying the angle between the directors relative to the direction of the incoming light. Such tilting of the directors in the LC layer is produced by varying the strength of an electric or magnetic field across the LC layer 62. The directors typically tend to align themselves generally parallel to the direction of the electric or magnetic field. There is a threshold field strength below which the directors do not appreciably respond to the applied field and above which they respond monotonically as the field strength increases until realignment in response to the field reaches saturation.

The refractive index of the LC layer 62 changes in response to a change of field strength to produce a variation of optical properties, e.g., focal length, in the imaging lens assembly 20 in the imaging reader. When a voltage V is applied across the electrodes 56, 60, the electric field will produce a centro-symmetrical gradient distribution of refractive index "n" within the LC layer 62.

By changing the voltage in the LC lens 50, the focal point is varied between a close-in position WD1 and a far-out position WD2 arranged along the optical path 46. The symbol 38 can be read at, and anywhere between, these end-limiting positions, thereby extending the working range or depth of focus in which to collect light from the symbol.

The voltage is preferably periodic, preferably a square wave drive voltage. The square wave is easily created with a variable duty cycle by the controller 36 having a built-in pulse width modulator circuit. The drive voltage could also be a sinusoidal or a triangular wave signal, in which case, the amplitude of the voltage controls the focal length and the working distance. The square wave does not require a voltage as high as the sinusoidal wave for a given change in focal length. When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the microprocessor or controller 36 The voltage could also be a plurality of different constant DC voltages. The voltage can be initiated at the pull of the trigger 34, or only after a symbol has been detected. The voltage can be applied automatically, or only after a signal analyzer 48, preferably another microprocessor, has determined that the symbol being scanned has not yet been successfully decoded and read.

FIG. 4 is analogous to FIG. 3, except that it depicts a movable optical element 64 movable by a drive 66 under control of the controller 36. As before, the change in position of the optical element 64 enables the extended depth of focus to be achieved.

The imaging lens assembly 20 may also have a fixed convex lens 72 at one axial end region of the adjustable element 50, 64 and/or another fixed lens 74 at the opposite axial end region of the adjustable element 50, 64. Each fixed lens 72, 74 may be separate from, or integral with, the adjustable element 50, 64. Reference numerals 72, 74 may represent a single lens as shown, or a cylindrical lens as described above, or a plurality of lenses, especially a triplet. These fixed lenses 72, 74 assist in minimizing any kind of aberrations, for example, chromatic aberrations. The imaging lens assembly 20 may advantageously include an aperture stop which can be positioned anywhere in the optical path 46.

Figure 6:
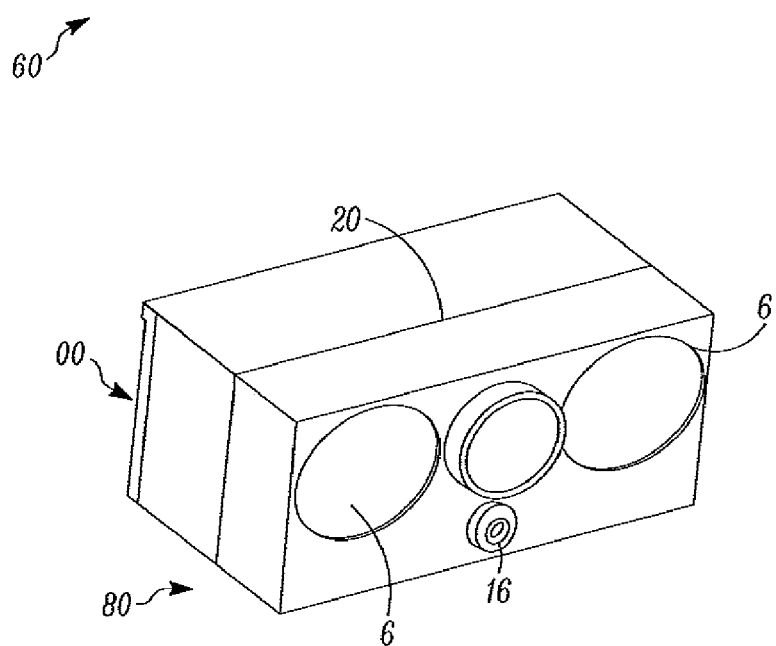
FIG. 6 is a perspective view of the module of FIG. 5 in a standardized form factor.

It will be understood that each of the elements described above, or two or more together, also may find a useful application in other types of constructions differing from the types described above. Thus, as previously mentioned, imaging readers having different housing configurations can be used. To that end, another feature of this invention resides in providing a compact module of a form factor standardized to fit in diverse housings of different shapes. Thus, as shown in FIGS. 5-6, an imaging module 80 is designed to have a standardized form factor measuring 19 millimeters by 38 millimeters by 25 millimeters. This compact form factor is advantageously achieved by mounting a pair of folding mirrors 2, 4 between the imager 24 and the imaging lens assembly 20, thereby double folding the optical path along which the return light travels within the module.

While the invention has been illustrated and described as reading one-dimensional symbols at variable working distances from an imaging reader or module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. An imaging module for electro-optically reading one-dimensional symbols located at variable working distances from the module, comprising:
   an illuminator for illuminating the symbols, including a light source for emitting illumination light, and an optical element for modifying the illumination light to form a line of high intensity light across the symbols;
   a solid-state imager having a linear array of image sensors arranged in a single row for capturing return light from the symbols;
   an imaging lens assembly for adjustably focusing the return light onto the linear array of image sensors to enable the symbols to be read, wherein the imaging lens assembly including a variable focal lengths lens is configured to focus the line of high intensity light across the symbols onto the linear array of image sensors; and
   wherein the linear array has on the order of at least 1,500 of the image sensors arranged in the single row.

2. The module of claim 1, wherein the imager is an unpackaged chip, and a printed circuit board on which the unpackaged chip is mounted.

3. The module of claim 1, wherein each of the sensors has a generally elongated shape and measures about 5.5 microns in width by 64 microns in height.

4. The module of claim 1, wherein the line of high intensity light is visible and aimable at the symbols prior to reading.

5. The module of claim 1, and an aiming laser for emitting a visible aiming light pattern on the symbols.

6. The module of claim 1, wherein the imaging lens assembly includes a movable optical element.

7. The module of claim 1, wherein the imaging lens assembly includes a nonmovable optical element.

8. The module of claim 1, and a pair of folding mirrors between the imaging lens assembly and the linear array of image sensors for folding the return light.

9. A method of electro-optically reading one-dimensional symbols located at variable working distances, comprising the steps of:
- illuminating the symbols by emitting illumination light and modifying the illumination light to form a line of high intensity light across the symbols;
- capturing return light from the symbols with a solid-state imager having a linear array of image sensors arranged in a single row;
- adjusting a focus length of a variable focal lengths lens to focus the line of high intensity light across the symbols onto the linear array of image sensors to enable the symbols to be read; and
- configuring the linear array with on the order of at least 1,500 of the image sensors arranged in the single row.

10. The method of claim 9, and configuring the imager as an unpackaged chip, and mounting the unpackaged chip on a printed circuit board.

11. The method of claim 9, and configuring each of the sensors with a generally elongated shape that measures about 5.5 microns in width by 64 microns in height.

12. The method of claim 9, wherein the line of high intensity light is visible and aiming the visible line of high intensity light at the symbols prior to reading.

13. The method of claim 9, wherein the focusing step is performed by moving an optical element.

14. The method of claim 9, wherein the focusing step is performed by a non-moving optical element.

15. The method of claim 9, wherein the adjustably focusing step is performed by an imaging lens assembly, and the step of folding the return light by mounting a pair of folding mirrors between the imaging lens assembly and the linear array of image sensors.

16. The method of claim 9, wherein the adjustably focusing step is performed by an imaging lens assembly, and the step of supporting the imaging lens assembly and the linear array of image sensors in a handheld housing.

* * * * *

UNITED STATES PATENT AND TRADEMARK OFFICE
CERTIFICATE OF CORRECTION

PATENT NO. : 8,079,526 B2
APPLICATION NO. : 12/077231
DATED : December 20, 2011
INVENTOR(S) : Barkan et al.

Page 1 of 1

It is certified that error appears in the above-identified patent and that said Letters Patent is hereby corrected as shown below:

In Fig. 6, Sheet 3 of 3, delete " 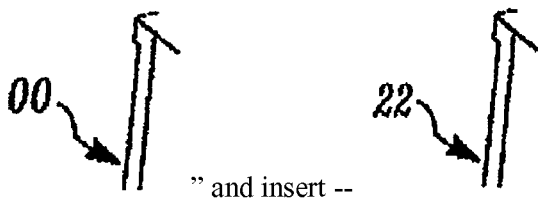 " and insert -- -- --, therefor.

In Column 7, Line 52, delete "36 The" and insert -- 36. The --, therefor.

In Column 8, Line 40, delete "claims:" and insert -- claims. --, therefor.

Signed and Sealed this
Eighteenth Day of December, 2012

David J. Kappos
*Director of the United States Patent and Trademark Office*